United States Patent
Ootou et al.

(10) Patent No.: US 10,543,575 B2
(45) Date of Patent: Jan. 28, 2020

(54) MACHINE TOOL AND AXIAL MOVEMENT CONTROL METHOD

(71) Applicant: FANUC CORPORATION, Yamanashi (JP)

(72) Inventors: Satoshi Ootou, Yamanashi-ken (JP); Masahiro Murota, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/114,562

(22) Filed: Aug. 28, 2018

(65) Prior Publication Data

US 2019/0061088 A1 Feb. 28, 2019

(30) Foreign Application Priority Data

Aug. 28, 2017 (JP) ................................ 2017-163201

(51) Int. Cl.
*B23Q 17/24* (2006.01)
*B23Q 17/20* (2006.01)

(52) U.S. Cl.
CPC ......... *B23Q 17/2409* (2013.01); *B23Q 17/20* (2013.01); *B23Q 17/2457* (2013.01)

(58) Field of Classification Search
None
See application file for complete search history.

(56) References Cited

U.S. PATENT DOCUMENTS

| 7,102,815 B2 * | 9/2006 | Ishii | G02B 21/26 359/363 |
| 2012/0257276 A1 * | 10/2012 | Tezuka | B23Q 17/2409 359/464 |
| 2013/0176429 A1 | 7/2013 | Kurashi | |

(Continued)

FOREIGN PATENT DOCUMENTS

| JP | 5172524 A | 7/1993 |
| JP | 4954608 B2 | 6/2012 |

(Continued)

OTHER PUBLICATIONS

English Machine Translation for Japanese Publication No. 2016-132039 A, published Jul. 25, 2016, 11 pgs.

(Continued)

Primary Examiner — Kate H Luo
(74) Attorney, Agent, or Firm — Fredrikson & Byron, P.A.

(57) ABSTRACT

A machine tool, which carries out machining on a workpiece using a tool, is equipped with a servo motor configured to cause axial movement of the tool, an imaging device configured to capture an image of the tool at a specified imaging magnification, a display unit configured to display the image captured by the imaging device, a command position calculating unit configured to, in the case that the imaging magnification is changed, calculate a movement command position of the tool on the basis of the imaging magnification before and after having been changed, so as to maintain a relative positional relationship between a specified point of (Continued)

the tool in the image, and an imaging center position in the image before and after the change in the imaging magnification, and a motor control unit configured to control the servo motor on the basis of the movement command position.

14 Claims, 9 Drawing Sheets

(56) References Cited

U.S. PATENT DOCUMENTS

| | | | | |
|---|---|---|---|---|
| 2014/0169637 | A1* | 6/2014 | Zuest | G01B 9/04 |
| | | | | 382/106 |
| 2014/0337775 | A1* | 11/2014 | Northrup | G06F 8/34 |
| | | | | 715/770 |
| 2014/0340508 | A1* | 11/2014 | Yamamoto | B23Q 17/2233 |
| | | | | 348/94 |

FOREIGN PATENT DOCUMENTS

| | | |
|---|---|---|
| JP | 2013176822 A | 9/2013 |
| JP | 2016060008 A | 4/2016 |
| JP | 2016132039 A | 7/2016 |
| WO | 2012053645 A1 | 4/2012 |

OTHER PUBLICATIONS

English Machine Translation for Japanese Publication No. H05-172524 A, published Jul. 9, 1993, 11 pgs.
English Abstract and Machine Translation for Japanese Publication No. 4954608 B2, published 2012-206-20, 10 pgs.
English Abstract and Machine Translation for Japanese Publication No. 2016-060008 A, published Apr. 25, 2016, 6 pgs.
English Abstract and Machine Translation for Japanese Publication No. 2013-176822 A, published Sep. 9, 2013, 8 pgs.

* cited by examiner

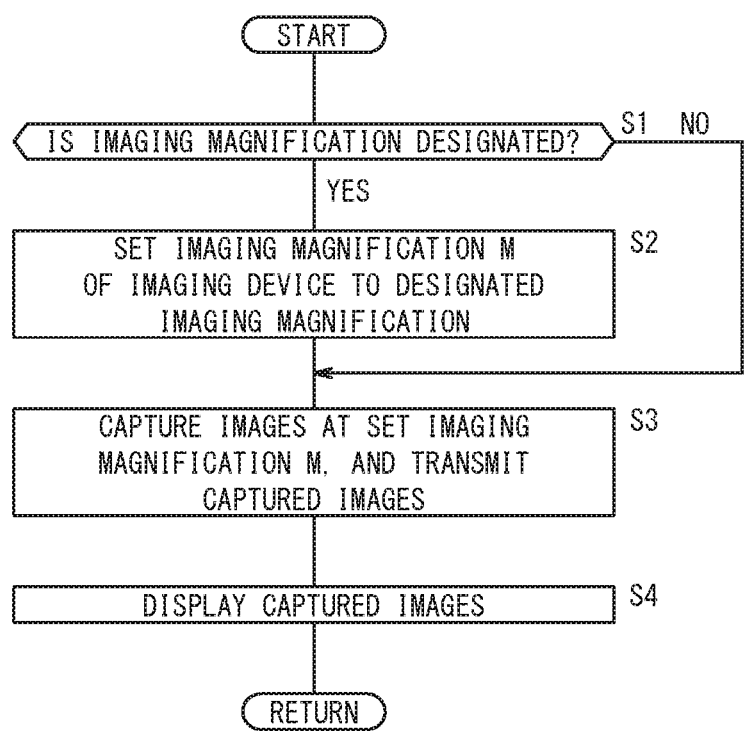

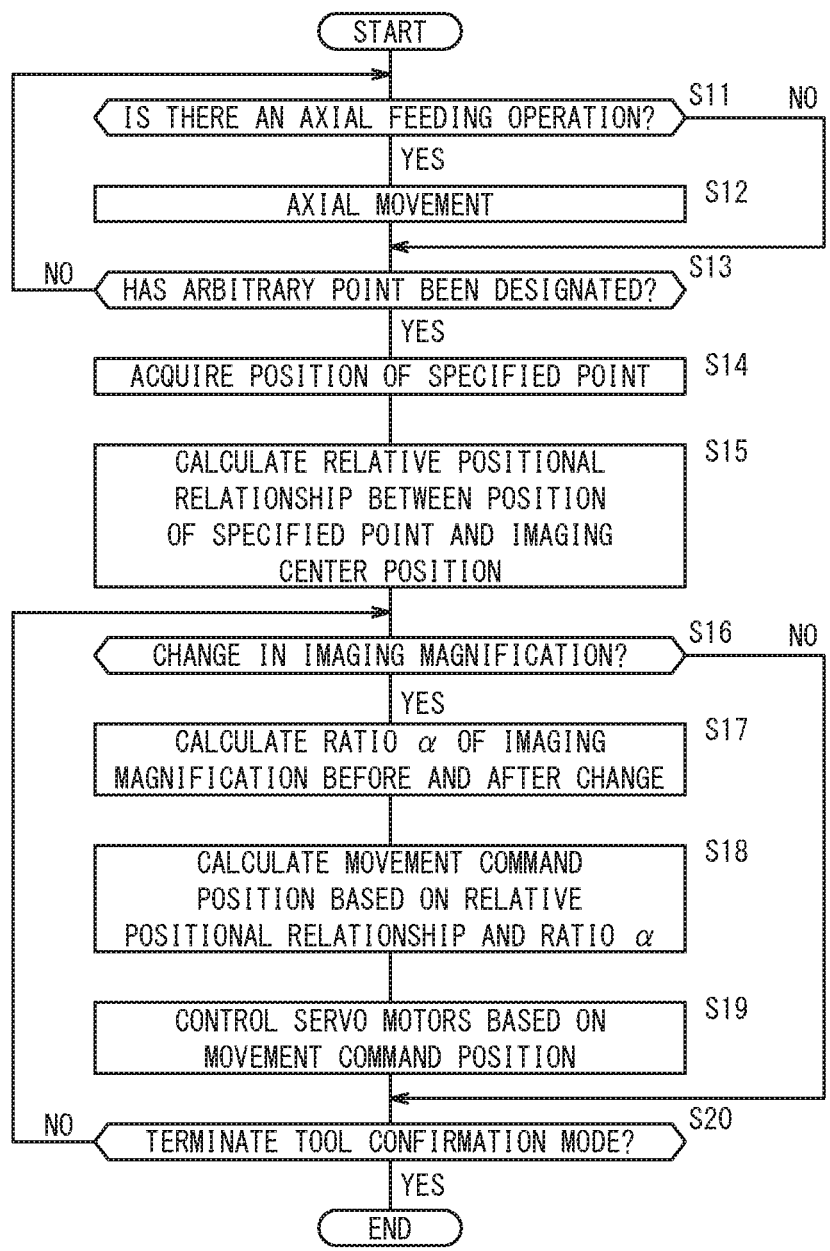

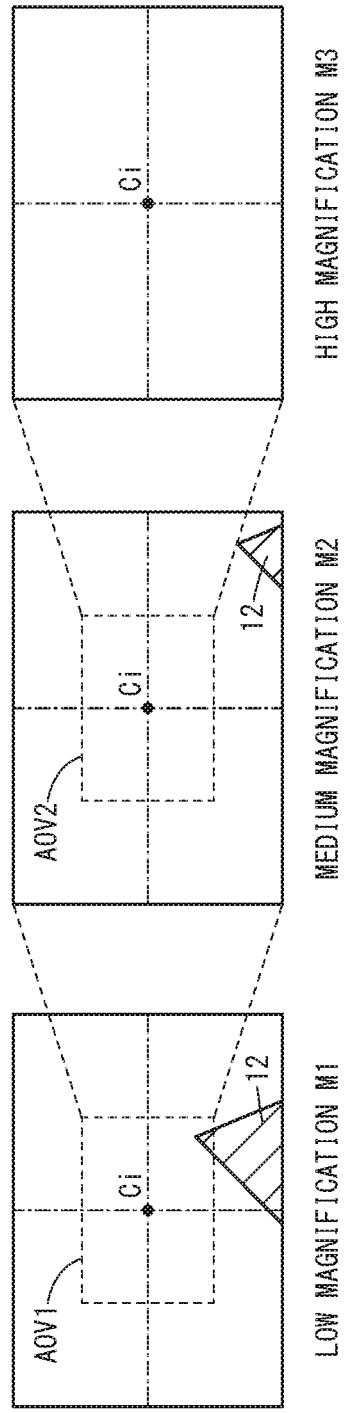

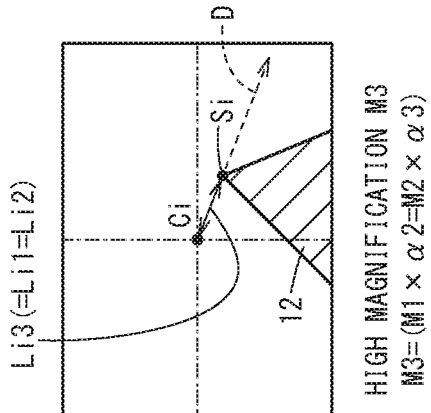
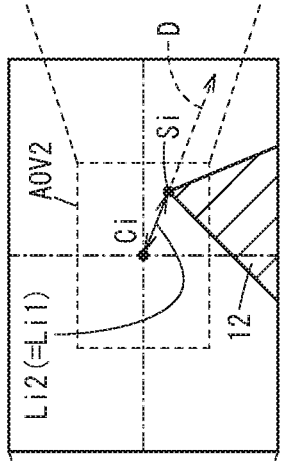
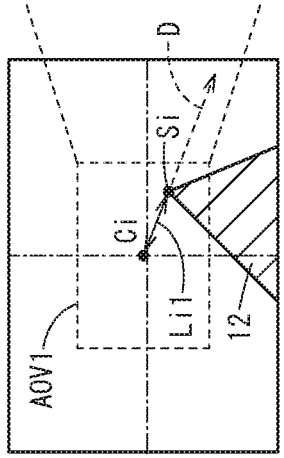

LOW MAGNIFICATION Ma

LOW MAGNIFICATION Ma

HIGH MAGNIFICATION Mb

HIGH MAGNIFICATION Mb

MACHINE TOOL AND AXIAL MOVEMENT CONTROL METHOD

CROSS-REFERENCE TO RELATED APPLICATION

This application is based upon and claims the benefit of priority from Japanese Patent Application No. 2017-163201 filed on Aug. 28, 2017, the contents of which are incorporated herein by reference.

BACKGROUND OF THE INVENTION

Field of the Invention

The present invention relates to a machine tool and an axial movement control method for controlling the position of a tool or a workpiece in accordance with an imaging magnification of a captured image.

Description of the Related Art

Conventionally, in the field of machine tools, an imaging device has been provided in a machine tool, and the machine tool has carried out a predetermined process by analyzing images of a tool or a workpiece captured by the imaging device, and has displayed the captured images.

For example, in Japanese Laid-Open Patent Publication No. 2013-176822, a machine tool is disclosed in which a plurality of cameras are installed in a machining space, and directions, focal lengths, zoom magnifications and the like of the cameras are controlled in synchronism with movements of a cutting edge of a tool, whereby automated following of the tool is performed, and images acquired by the cameras are displayed on a display of an operation panel.

SUMMARY OF THE INVENTION

An operator performs an operation of appropriately changing an imaging magnification, for example, at a time of confirming the state of a tip end of a tool or a machined surface of a workpiece after a machining process has been performed. However, when the operator is performing confirmation of the tool in the image, in the case that the tool is separated away from an imaging center position, if the imaging magnification is increased, then a problem has occurred in that the tool becomes framed out, i.e., falls outside the frame of the image. However, such a problem cannot be solved with the technique disclosed in Japanese Laid-Open Patent Publication No. 2013-176822. Therefore, in the case of such framing out, it is necessary for the operator to manually perform an axial feeding operation while confirming the image, in a manner so that the tool enters into the zoomed-up image, which leads to worsening of operation efficiency.

Thus, an object of the present invention is to provide a machine tool and an axial movement control method, in which a tool does not become framed out (i.e., the tool does not fall outside the frame of the image), even in the case that the imaging magnification is changed.

A first aspect of the present invention is characterized by a machine tool configured to perform machining on a workpiece using a tool, including a motor configured to cause axial movement of the tool or the workpiece, an imaging device configured to capture an image of the tool or the workpiece at a specified imaging magnification, a display unit configured to display the image captured by the imaging device, a command position calculating unit configured to, in the case that the imaging magnification is changed, calculate a movement command position of the tool or the workpiece on the basis of the imaging magnification before and after having been changed, so as to maintain a relative positional relationship between a specified point of the tool or the workpiece in the image, and an imaging center position in the image before and after the change in the imaging magnification, and a motor control unit configured to control the motor in a manner so that the tool or the workpiece is axially moved on the basis of the movement command position.

A second aspect of the present invention is characterized by an axial movement control method for controlling axial movement of a machine tool configured to perform machining on a workpiece using a tool, wherein the machine tool includes a motor configured to cause axial movement of the tool or the workpiece, and the axial movement control method includes an imaging step of capturing an image of the tool or the workpiece at a specified imaging magnification, a displaying step of displaying the captured images on a display unit, a command position calculating step of calculating, in the case that the imaging magnification is changed, a movement command position of the tool or the workpiece on the basis of the imaging magnification before and after having been changed, so as to maintain a relative positional relationship between a specified point of the tool or the workpiece in the image, and an imaging center position in the image before and after the change in the imaging magnification, and a motor controlling step of controlling the motor in a manner so that the tool or the workpiece is axially moved on the basis of the movement command position.

According to the present invention, even if the imaging magnification is changed, it is possible to prevent the tool or the workpiece from being framed out, i.e., from falling outside the image area.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 3 is a flowchart illustrating image capturing operations of the machine tool shown in FIGS. 1 and 2;

FIG. 4 is a flowchart illustrating operations when a tool confirmation mode of the machine tool shown in FIGS. 1 and 2 is set;

FIG. 5A is a view showing an image at a time that an image of a tool is captured at an imaging magnification of low magnification according to a conventional technique;

FIG. 5B is a view showing an image at a time that an image of a tool is captured at an imaging magnification of medium magnification according to a conventional technique;

FIG. 5C is a view showing an image at a time that an image of a tool is captured at an imaging magnification of high magnification according to a conventional technique;

FIG. 6A is a view showing an image at a time that an image of a tool is captured at an imaging magnification of low magnification by the machine tool shown in FIG. 2;

FIG. 6B is a view showing an image at a time that an image of a tool is captured at an imaging magnification of medium magnification by the machine tool shown in FIG. 2;

FIG. 6C is a view showing an image at a time that an image of a tool is captured at an imaging magnification of high magnification by the machine tool shown in FIG. 2;

DESCRIPTION OF THE PREFERRED EMBODIMENTS

Preferred embodiments of a machine tool and an axial movement control method according to the present invention will be presented and described in detail below with reference to the accompanying drawings.

First Embodiment

Figure 1:
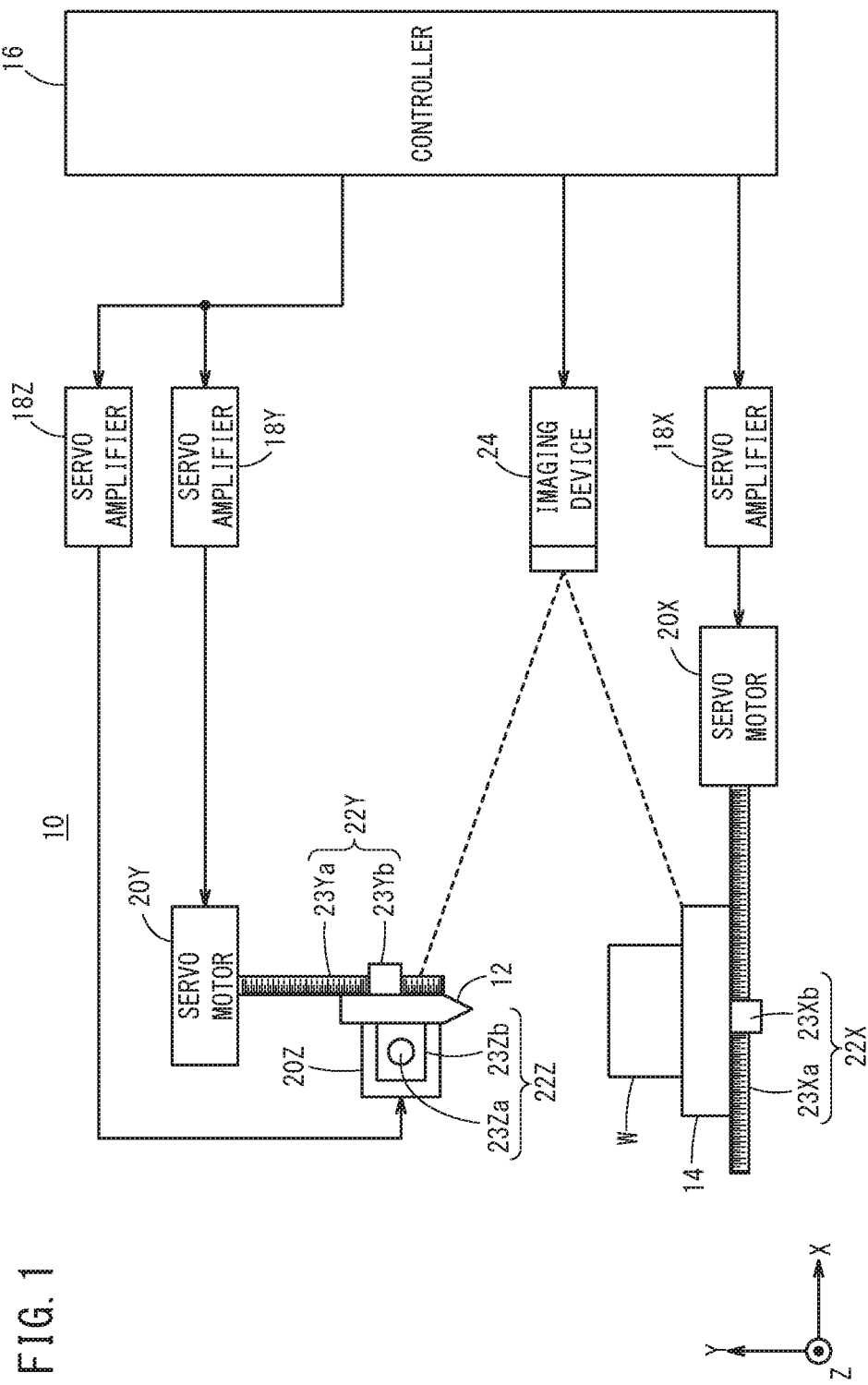
FIG. 1 is a schematic configuration diagram of a machine tool according to a first embodiment.

FIG. 1 is a schematic configuration diagram of a machine tool 10. The machine tool 10 is a machine tool adapted to machine a workpiece W (object to be machined) using a tool 12. The machine tool 10 is equipped with the tool 12, a table 14, a controller 16, servo amplifiers 18 (18Y, 18Z, 18X), servo motors (motors) 20 (20Y, 20Z, 20X), power conversion transmission mechanisms 22 (22Y, 22Z, 22X), and an imaging device 24.

The controller 16 rotates the servo motors 20 (20Y, 20Z, 20X) by controlling the servo amplifiers 18 (18Y, 18Z, 18X). In other words, the controller 16 controls rotation of the servo motors 20 (20Y, 20Z, 20X) through the servo amplifiers 18 (18Y, 18Z, 18X). The servo motor 20Y is a motor for the purpose of axially moving the tool 12 in a Y-axis direction, and the servo motor 20Z is a motor for the purpose of axially moving the tool 12 in a Z-axis direction. Further, the servo motor 20X is a motor for the purpose of axially moving the table 14 in an X-axis direction. Accordingly, the controller 16 controls rotation of the servo motors 20Y, 20Z, 20X through the servo amplifiers 18Y, 18Z, 18X, to thereby axially move the tool 12 in the Y-axis direction and the Z-axis direction, and axially move the table 14 that supports the workpiece W in the X-axis direction. Moreover, the X-axis, the Y-axis, and the Z-axis are assumed to be orthogonal to each other.

A rotational force of the servo motor (first servo motor, Y-axis servo motor) 20Y is transmitted to the tool 12 via the power conversion transmission mechanism 22Y. The power conversion transmission mechanism 22Y converts the rotational force of the servo motor 20Y into linear motion in the Y-axis direction. Accordingly, by rotation of the servo motor 20Y, the tool 12 is axially moved in the Y-axis direction (first direction). The power conversion transmission mechanism 22Y includes a ball screw 23Ya that extends in the Y-axis direction, and a nut 23Yb that is screw-engaged with the ball screw 23Ya. The ball screw 23Ya is connected to a rotary shaft (not shown) of the servo motor 20Y, and rotates together with the rotary shaft of the servo motor 20Y. The nut 23Yb is connected to the tool 12. Consequently, the ball screw 23Ya is rotated by the servo motor 20Y, whereby the nut 23Yb (and the tool 12) is axially moved in the Y-axis direction.

A rotational force of the servo motor (second servo motor, Z-axis servo motor) 20Z is transmitted to the tool 12 via the power conversion transmission mechanism 22Z. The power conversion transmission mechanism 22Z converts the rotational force of the servo motor 20Z into linear motion in the Z-axis direction. Accordingly, by rotation of the servo motor 20Z, the tool 12 is axially moved in the Z-axis direction (second direction). The power conversion transmission mechanism 22Z includes a ball screw 23Za that extends in the Z-axis direction, and a nut 23Zb that is screw-engaged with the ball screw 23Za. The ball screw 23Za is connected to a rotary shaft (not shown) of the servo motor 20Z, and rotates together with the rotary shaft of the servo motor 20Z. The nut 23Zb is connected to the tool 12. Consequently, the ball screw 23Za is rotated by the servo motor 20Z, whereby the nut 23Zb (and the tool 12) is axially moved in the Z-axis direction.

A rotational force of the servo motor (third servo motor, X-axis servo motor) 20X is transmitted to the table 14 via the power conversion transmission mechanism 22X. The power conversion transmission mechanism 22X converts the rotational force of the servo motor 20X into linear motion in the X-axis direction. Accordingly, by rotation of the servo motor 20X, the table 14 is axially moved in the X-axis direction (third direction). The power conversion transmission mechanism 22X includes a ball screw 23Xa that extends in the X-axis direction, and a nut 23Xb that is screw-engaged with the ball screw 23Xa. The ball screw 23Xa is connected to a rotary shaft (not shown) of the servo motor 20X, and rotates together with the rotary shaft of the servo motor 20X. The nut 23Xb is connected to the table 14. Consequently, the ball screw 23Xa is rotated by the servo motor 20X, whereby the nut 23Xb (and the table 14) is axially moved in the X-axis direction.

The imaging device 24 captures images of at least the tool 12 from a direction intersecting the plane (YZ plane) defined by the Y-axis direction and the Z-axis direction. The imaging device 24 includes a zooming function, and is capable of capturing images at an arbitrary imaging magnification M. The zooming function of the imaging device 24 may be constituted in the form of optical zooming or electronic zooming. In the first embodiment, for example, the minimum imaging magnification M of the imaging device 24 is set to 100 times, and the maximum imaging magnification M is set to 1000 times. Accordingly, the imaging device 24 is capable of capturing images of the tool 12 with an imaging magnification M ranging from 100 times to 1000 times. Moreover, the imaging device 24 captures images at a predetermined frame rate, or in other word, captures a moving image. The imaging device 24 is arranged in a fixed manner by a non-illustrated support member.

Next, with reference to FIG. 2, a brief description will be given concerning the configuration of the controller 16. The controller 16 comprises an input unit 30, a higher order control unit 32, a motor control unit 34, a display unit 36, and a storage medium 38.

The input unit 30 is an operation unit by which an operator inputs a command or the like. The input unit 30 is constituted by a numeric keypad used for entering numerical data, a keyboard, a touch panel, a volume knob, and the like. By the operator operating the input unit 30, designation of an arbitrary point (specified point Si) of the tool 12 or the workpiece W in the image, and designation of the imaging magnification M can be performed. The arbitrary point may be a location (e.g., a cutting edge) where the operator most wishes to confirm and observe the state on the tool 12.

The higher order control unit 32 includes a processor such as a CPU, and by executing a basic program (not shown) stored in the storage medium 38, the processor functions as the higher order control unit 32 of the first embodiment. The higher order control unit 32 controls the motor control unit 34. Other details concerning the configuration of the higher order control unit 32 will be described later.

In accordance with a control of the higher order control unit 32, the motor control unit 34 controls the servo motors 20 (20X, 20Y, 20Z) through the servo amplifiers 18 (18X, 18Y, 18Z). Other details concerning the motor control unit 34 will be described later.

The display unit 36 is constituted by a liquid crystal display or the like, and displays necessary information to the operator. Moreover, a touch panel of the input unit 30 is provided on a display screen of the display unit 36. The storage medium 38 stores data (a basic program and the like) necessary for performing controls by the higher order control unit 32, and a machining program 38a and the like.

Next, a description will be given in detail concerning the configuration of the higher order control unit 32. The higher order control unit 32 includes an image acquisition unit 50, a display control unit 52, an imaging magnification acquisition unit 54, a specified point setting unit 56, a command position calculating unit 58, and a machining program analyzing unit 60.

The image acquisition unit 50 acquires from the imaging device 24 the images of the tool 12 and the workpiece W (table 14) that were captured by the imaging device 24. The controller 16 is capable of communicating with the imaging device 24 wirelessly or over wires. The image acquisition unit 50 outputs the acquired images to the display control unit 52 and the command position calculating unit 58. Since the imaging device 24 captures images at a predetermined frame rate, the image acquisition unit 50 also acquires the images at a predetermined frame rate.

The display control unit 52 causes the display unit 36 to display the images (captured images) acquired by the image acquisition unit 50. Consequently, at least images of the tool 12 that are captured by the imaging device 24 are displayed on the display unit 36. Moreover, the display control unit 52 may include an image processing unit that carries out image processing on the images acquired by the image acquisition unit 50, and may display the images that were subjected to image processing on the display unit 36.

The imaging magnification acquisition unit 54 includes a memory 54a for the purpose of storing imaging magnifications M of the imaging device 24. More specifically, the memory 54a stores at least an imaging magnification M at a time that a specified point Si, to be described later, is set, and a current imaging magnification M. Accordingly, when the imaging magnification M is changed, the (current) imaging magnification M after having been changed is newly stored in the memory 54a. The imaging magnification M may be changed on the side of the controller 16, or the imaging magnification M may be changed on the side of the imaging device 24.

According to the present embodiment, unless specified otherwise, the imaging magnification M is changed on the side of the controller 16. Accordingly, when the imaging magnification M is input by an operation of the input unit 30 made by the operator, the imaging magnification acquisition unit 54 stores the imaging magnification M that was input in the memory 54a, and transmits the stored imaging magnification M to the imaging device 24. Upon receiving the imaging magnification M, the imaging device 24 sets the imaging magnification M to the received magnification M. The imaging device 24 changes the angle of view (field angle) on the basis of the set imaging magnification M. Moreover, in the case that the imaging magnification M is changed (designated) on the side of the imaging device 24, the imaging magnification acquisition unit 54 acquires the imaging magnification M after having been changed from the imaging device 24, and stores the acquired imaging magnification M in the memory 54a.

The specified point setting unit 56 sets as the specified point Si an arbitrary point on the tool 12 in the image which is designated by the operator, and outputs to the command position calculating unit 58 the position (coordinate information) of the specified point Si in the image that was set. In the first embodiment, it is assumed that the cutting edge is set as the specified point Si.

The command position calculating unit 58 calculates a movement command position Pc of the tool 12 on the basis of the imaging magnification M before a change thereof and the imaging magnification M after having been changed, so as to maintain a relative positional relationship between the specified point Si on the tool 12 and an imaging center position Ci in the image before and after the change in the imaging magnification M. In addition, the command position calculating unit 58 outputs the calculated movement command position Pc to the motor control unit 34.

More specifically, the command position calculating unit 58 includes a relative position calculating unit 58a and a memory 58b. The relative position calculating unit 58a calculates a relative positional relationship between a specified point Sr and an imaging center position Cr in a machine coordinate system, on the basis of the imaging magnification M at the time that the specified point Si is set (hereinafter referred to as a reference magnification Mm), and the position of the specified point Si in the image at the time that the specified point Si is set. As the relative positional relationship in the machine coordinate system, the relative position calculating unit 58a calculates a direction D of the specified point Sr from the imaging center position Cr in the machine coordinate system, and together therewith, calculates an actual distance Lr between the imaging center position Cr in the machine coordinate system and the specified point Sr in the machine coordinate system. In other words, the direction D and the distance Lr are information indicative of the relative positional relationship between the specified point Sr and the imaging center position Cr in the machine coordinate system. The relative positional relationship is stored in the memory 58b.

As a method for calculating the direction D, for example, a direction of the specified point Si as viewed from the imaging center position Ci in the image may be calculated as the direction D. Further, the position of the specified point Sr in the machine coordinate system may be obtained from the reference magnification Mm and the position of the specified point Si in the image, and the direction D may be calculated from the calculated position of the specified point Sr, and the imaging center position Cr in the machine coordinate system.

Further, as a method for calculating the distance Lr, for example, a distance Li between the position of the specified point Si in the image and the imaging center position Ci in the image may be calculated, and the distance Lr may be calculated from the calculated distance Li and the reference magnification Mm. Alternatively, the position of the specified point Sr in the machine coordinate system may be obtained from the reference magnification Mm and the position of the specified point Si in the image, and the distance Lr may be calculated from the calculated specified point Sr, and the imaging center position Cr in the machine coordinate system. Moreover, it is assumed that the imaging center position Ci in the image and the imaging center position Cr in the machine coordinate system are already known, and are stored in advance in the memory 58b.

In addition, the command position calculating unit 58 calculates the movement command position Pc on the basis of the calculated distance Lr and direction D, and a ratio α of the imaging magnification M before and after the change. According to the first embodiment, the ratio of the imaging magnification M after having been changed, to the reference magnification Mm is set as the ratio α. For example, if the imaging magnification M after having been changed is denoted by M', the ratio α is defined by α=M'/Mm.

To provide a more detailed description of the movement command position Pc, the command position calculating unit 58 calculates the movement command position Pc in a manner so that the specified point Sr in the machine coordinate system moves to the position of an intersecting point between the direction D and a circle having a radius of Lr×1/α from the imaging center position Cr in the machine coordinate system. Accordingly, the tool 12 moves along the direction D in a manner so that the distance from the imaging center position Cr to the specified point Sr in the machine coordinate system becomes Lr×1/α.

Moreover, since the tool 12 moves in the Y-axis direction and the Z-axis direction, the calculated movement command position Pc (Pcy, Pcz) is made up from a first movement command position Pcy in the Y-axis direction (first direction), and a second movement command position Pcz in the Z-axis direction (second direction).

The machining program analyzing unit 60 analyzes the machining program 38a that is stored in the storage medium 38, and outputs the analysis result to the motor control unit 34.

The motor control unit 34 controls the servo motors 20Y, 20Z respectively through the servo amplifiers 18Y, 18Z, so that the tool 12 is axially moved on the basis of the movement command position Pc (Pcy, Pcz). More specifically, the motor control unit 34 controls the servo motor 20Y on the basis of the first movement command position Pcy, and controls the servo motor 20Z on the basis of the second movement command position Pcz.

In the case that machining of the workpiece W is carried out using the machining program 38a, the motor control unit 34 controls the servo motors 20Y, 20Z, 20X on the basis of the analysis result of the machining program 38a. Consequently, the tool 12 is axially moved in the Y-axis direction and the Z-axis direction, the table 14 is axially moved in the X-axis direction, and the workpiece W is machined by the tool 12. Further, when axial feeding operations (Y-axis feeding operations, Z-axis feeding operations, X-axis feeding operations) are performed by operations of the input unit 30 made by the operator, the motor control unit 34 controls the servo motors 20Y, 20Z, 20X in accordance with the axial feeding operations.

Figure 2:
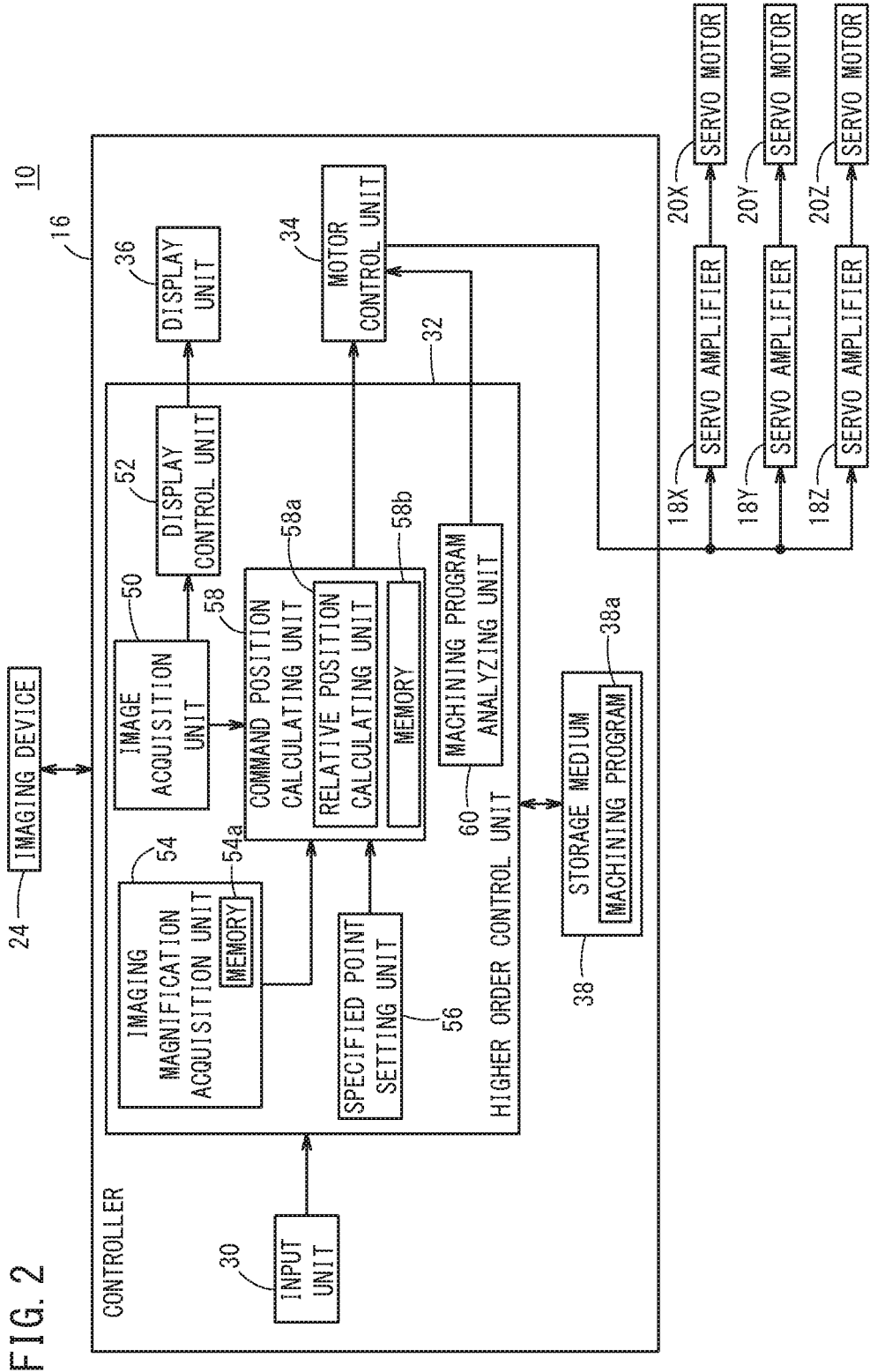
FIG. 2 is a diagram showing the configuration of a controller shown in FIG. 1.

FIG. 3 is a flowchart illustrating image capturing operations of the machine tool 10 shown in FIG. 2. In step S1, the imaging magnification acquisition unit 54 determines whether or not the imaging magnification M of the imaging device 24 has been designated (input) by the operator having operated the input unit 30. If it is determined in step S1 that the imaging magnification M has been designated, the process proceeds to step S2. At this time, the imaging magnification acquisition unit 54 stores the designated imaging magnification M in the memory 54a, and transmits the designated imaging magnification M to the imaging device 24. On the other hand, if it is determined in step S1 that the imaging magnification M has not been designated, the process proceeds to step S3.

Upon proceeding to step S2, the imaging device 24 sets the imaging magnification M of the imaging device 24 to the imaging magnification M that was transmitted from the imaging magnification acquisition unit 54, whereupon the process proceeds to step S3. On the basis of the set imaging magnification M, the imaging device 24 causes the angle of view to change (undergo optical zooming) by driving a zoom lens (not shown), or causes the angle of view to change (undergo electronic zooming) by changing the range of the image to be cropped (subjected to trimming).

Upon proceeding to step S3, the imaging device 24 captures images of at least the tool 12 at the set imaging magnification M. In addition, the imaging device 24 transmits the images to the image acquisition unit 50. Next, in step S4, the display control unit 52 causes the display unit 36 to display thereon the images acquired by the image acquisition unit 50 from the imaging device 24.

According to the operations illustrated in FIG. 3, the imaging magnification M of the imaging device 24 is changed on the side of the controller 16, however, the imaging magnification M may also be changed on the side of the imaging device 24. In step S1, the imaging device 24 determines that the imaging magnification M has been specified in the event that a zooming operation is carried out by the operator, in accordance with an operation of an operation unit of the imaging device 24. In addition, in step S2, the imaging device 24 sets the imaging magnification M in accordance with the zooming operation. At this time, the imaging device 24 transmits the set imaging magnification M to the imaging magnification acquisition unit 54, and the imaging magnification acquisition unit 54 stores the imaging magnification M that was transmitted from the imaging device 24 in the memory 54a. Further, a display unit that differs from the display unit 36 may be provided on the imaging device 24, and the imaging device 24 may display the captured images on such a separate display unit.

FIG. 4 is a flowchart showing operations of the machine tool 10 shown in FIG. 2 when a tool confirmation mode is set. When the tool confirmation mode for confirming the state of the tool 12 is set, in step S11, the higher order control unit 32 determines whether or not an axial feeding operation of the tool 12 has been performed by an operation of the input unit 30 made by the operator. If it is determined in step S11 that an axial feeding operation has been performed, the process proceeds to step S12. On the other hand, if it is determined in step S11 that an axial feeding operation has not been performed by the operator, the process proceeds to step S13. Moreover, at this time, it is assumed that the imaging device 24 captures images of the tool 12 at the imaging magnification M that was set in step S2 of FIG. 3, and the captured images are displayed on the display unit 36 (steps S3, S4 of FIG. 3). Further, during the operations of FIG. 4, the operations of FIG. 3 are executed in parallel, and the operator is able to change the imaging magnification M.

Upon proceeding to step S12, the motor control unit 34 controls the servo motors 20Y, 20Z based on the axial feeding operation made by the operator, whereby axial movement of the tool 12 is carried out, and then the process proceeds to step S13. At this time, the command position calculating unit 58 outputs the movement command position Pc to the motor control unit 34 in accordance with the operation of the input unit 30 made by the operator. Consequently, the operator can axially feed the tool 12 in a manner so that the tool 12 enters into the imaging range (angle of view) of the imaging device 24. At this time, the operator performs the axial feeding operation so that the relative positional relationship between the imaging center position Ci and the tool 12 in the displayed image becomes a desired positional relationship.

Upon proceeding to step S13, the specified point setting unit 56 determines whether or not an arbitrary point on the tool 12 has been designated in the image displayed on the display unit 36 by an operation of the input unit 30 made by the operator. The operator can designate an arbitrary point on the tool 12 by operating a mouse or the like, or can designate an arbitrary point on the tool 12 by touching the display screen of the display unit 36 on which the touch panel is provided.

In step S13, if the specified point setting unit 56 determines that an arbitrary point on the tool 12 has been designated, the process proceeds to step S14. On the other hand, if it is determined in step S13 that designation of an arbitrary point has not been performed by the operator, the process returns to step S11.

Upon proceeding to step S14, the specified point setting unit 56 sets the designated point as the specified point Si, and calculates and acquires the position of the set specified point Si in the image. The imaging magnification M at the time of setting the specified point Si is treated as the reference magnification Mm.

Next, in step S15, on the basis of the position of the specified point Si in the image that was set in step S14 and the reference magnification Mm, the relative position calculating unit 58a calculates the relative positional relationship (direction D, distance Lr) between the position of the specified point Sr and the imaging center position Cr in the machine coordinate system. At this time, the relative position calculating unit 58a stores the calculated positional relationship (direction D, distance Lr) in the memory 58b.

Next, in step S16, the imaging magnification acquisition unit 54 determines whether or not the imaging magnification M has been changed due to an operation made by the operator. If it is determined in step S16 that the imaging magnification M has been changed, the process proceeds to step S17, whereas if it is determined that the imaging magnification M has not been changed, the process proceeds to step S20. Moreover, if the imaging magnification M has been changed, the imaging magnification acquisition unit 54 acquires the imaging magnification M after having been changed, and stores the acquired imaging magnification M in the memory 54a.

Upon proceeding to step S17, the command position calculating unit 58 calculates the ratio $\alpha$ of the imaging magnification M before and after the change (the ratio of the imaging magnification M after having been changed to the reference magnification Mm).

Next, in step S18, the command position calculating unit 58 calculates the movement command position Pc (Pcy, Pcz) on the basis of the relative positional relationship (direction D, distance Lr) calculated in step S15, and the ratio $\alpha$ calculated in step S17. More specifically, the movement command position Pc (Pcy, Pcz) is calculated in a manner so that the specified point Sr in the machine coordinate system moves to the position of an intersecting point between the direction D and a circle having a radius of Lr×1/$\alpha$ from the imaging center position Cr in the machine coordinate system.

Next, in step S19, the motor control unit 34 controls the servo motors 20Y, 20Z based on the movement command position Pc (Pcy, Pcz). Consequently, the tool 12 moves along the direction D in a manner so that the distance from the imaging center position Cr to the specified point Sr in the machine coordinate system becomes Lr×1/$\alpha$. As a result, on the display screen of the display unit 36, the relative positional relationship between the imaging center position Ci and the specified point Si in the image is kept constant before and after the change in the imaging magnification M.

Next, in step S20, the higher order control unit 32 determines whether or not the tool confirmation mode has been terminated. If setting of the tool confirmation mode has been canceled by an operation of the input unit 30 made by the operator, the higher order control unit 32 determines that the tool confirmation mode has been terminated.

If it is determined in step S20 that the tool confirmation mode has not been terminated, the process returns to step S16, and the above-described operations are repeated. On the other hand, if it is determined in step S20 that the tool confirmation mode has been terminated, the present operations are brought to an end.

Images displayed when the imaging magnification M is changed in the first embodiment will be described in comparison with conventional images. First, FIGS. 5A to 5C are diagrams showing images captured by a conventional apparatus. FIG. 5A is a view showing an image at a time that an image of the tool 12 is captured at an imaging magnification M (hereinafter referred to as M1) of low magnification, FIG. 5B is a view showing an image at a time that an image of the tool 12 is captured at an imaging magnification M (hereinafter referred to as M2) of medium magnification, and FIG. 5C is a view showing an image at a time that an image of the tool 12 is captured at an imaging magnification M (hereinafter referred to as M3) of high magnification. It should be noted that M1<M2<M3, and in FIGS. 5A to 5C, the positions of the tool 12 in the machine coordinate system are the same.

In the case of the imaging magnification M1 of low magnification, as shown in FIG. 5A, the tool 12 exists in close proximity to the imaging center position Ci in the image. However, when a change is made to the imaging magnification M2 of medium magnification, the angle of view of the image becomes smaller, and therefore, as shown in FIG. 5B, the tool 12 separates away from the imaging center position Ci in the image, and moves into a region at the lower right of the image. In addition, when a change is made to the imaging magnification M3 of high magnification, the angle of view of the image becomes further reduced, and therefore, as shown in FIG. 5C, the tool 12 is framed out (i.e., the tool 12 falls outside the image area). Moreover, a frame AOV1 shown in FIG. 5A illustrates the angle of view at the imaging magnification M2, and a frame AOV2 shown in FIG. 5B illustrates the angle of view at the imaging magnification M3. This same feature applies with respect to FIGS. 6A and 6B as well.

In contrast thereto, FIGS. 6A to 6C are views showing images captured by the machine tool 10 shown in FIG. 2. FIG. 6A is a view showing an image at a time that an image of the tool 12 is captured at the imaging magnification M1 of low magnification, FIG. 6B is a view showing an image at a time that an image of the tool 12 is captured at the imaging magnification M2 of medium magnification, and FIG. 6C is a view showing an image at a time that an image of the tool 12 is captured at the imaging magnification M3 of high magnification. It should be noted that M1<M2<M3, M2=M1×α1, M3=M1×α2=M2×α3, α2>α1>0, and α2=α1×α3.

The image shown in FIG. 6A is captured at the imaging magnification M1 of low magnification, and the tool 12 exists in close proximity to the imaging center position Ci. In this instance, in the image shown in FIG. 6A, it is assumed that the operator has designated the cutting edge of the tool 12 as the specified point Si. Accordingly, the imaging magnification M1 is treated as the reference magnification Mm. In this instance, in the state shown in FIG. 6A, the distance Lr between the cutting edge Sr and the imaging center position Cr in the machine coordinate system is denoted by Lr1, and the distance Li between the cutting edge Si and the imaging center position Ci in the image is denoted by Li1.

The image shown in FIG. 6B is captured at the imaging magnification M2 of medium magnification. In this instance, in the state shown in FIG. 6B, the distance Lr between the specified point Sr and the imaging center position Cr in the machine coordinate system is denoted by Lr2, and the distance Li between the cutting edge Si and the imaging center position Ci in the image is denoted by Li2. When the imaging magnification M is changed from M1 to M2, as has been described above, the tool 12 is moved along the direction D toward the imaging center position Cr, in a manner so that the distance Lr2 between the cutting edge Sr and the imaging center position Cr in the machine coordinate system becomes Lr2=Lr1×1/α1. At this time, the tool 12 is moved along the direction D by the distance (Lr1−Lr1×1/α1) so as to approach the imaging center position Cr.

Accordingly, the distance Li2 between the cutting edge Si and the imaging center position Ci in the image shown in FIG. 6B is given by Li2=α1×Li1×1/α1=Li1, and the direction of the cutting edge Si as viewed from the imaging center position Ci also coincides with the direction D. Thus, even if the imaging magnification M is changed from M1 to M2, the relative positional relationship between the specified point Si of the tool 12 and the imaging center position Ci in the image undergoes no change from that at the time of the imaging magnification M1.

The image shown in FIG. 6C is captured at the imaging magnification M3 of high magnification. In this instance, in the state shown in FIG. 6C, the distance Lr between the specified point Sr and the imaging center position Cr in the machine coordinate system is denoted by Lr3, and the distance Li between the cutting edge Si and the imaging center position Ci in the image is denoted by Li3. When the imaging magnification M is changed from M2 to M3, as has been described above, the tool 12 is moved along the direction D toward the imaging center position Cr, in a manner so that the distance Lr3 between the cutting edge Sr and the imaging center position Cr in the machine coordinate system becomes Lr3=Lr1×1/α2=Lr2×1/α3. At this time, the tool 12 is moved along the direction D by the distance (Lr2−Lr1×1/α2=Lr2−Lr2×1/α3) so as to approach the imaging center position Cr.

Accordingly, the distance Li3 between the cutting edge Si and the imaging center position Ci in the image shown in FIG. 6C is given by Li3=α2×Li1×1/α2=Li1 or Li3=α3×Li2×1/α3=Li2=Li1, and the direction of the cutting edge Si as viewed from the imaging center position Ci also coincides with the direction D. Thus, even if the imaging magnification M is changed from M2 to M3, the relative positional relationship between the specified point Si of the tool 12 and the imaging center position Ci in the image undergoes no change from that at the time of the imaging magnifications M1 and M2.

In the foregoing manner, according to the first embodiment, even if the imaging magnification M is changed, it is possible to maintain the relative positional relationship between the imaging center position Ci and the position of the specified point (cutting edge) Si in the image. Therefore, even if the imaging magnification M is changed from a low magnification to a high magnification, it is possible to prevent a situation in which the specified point (cutting edge) Si becomes framed out from the image (i.e., a situation in which the specified point Si falls outside the image area). Further, even if the imaging magnification M is changed, since the relative positional relationship between the imaging center position Ci and the position of the specified point (cutting edge) Si in the image is not changed, it becomes easy for the tool 12 (and in particular, the specified point Si thereon) to be confirmed by the operator.

Second Embodiment

Figure 7:
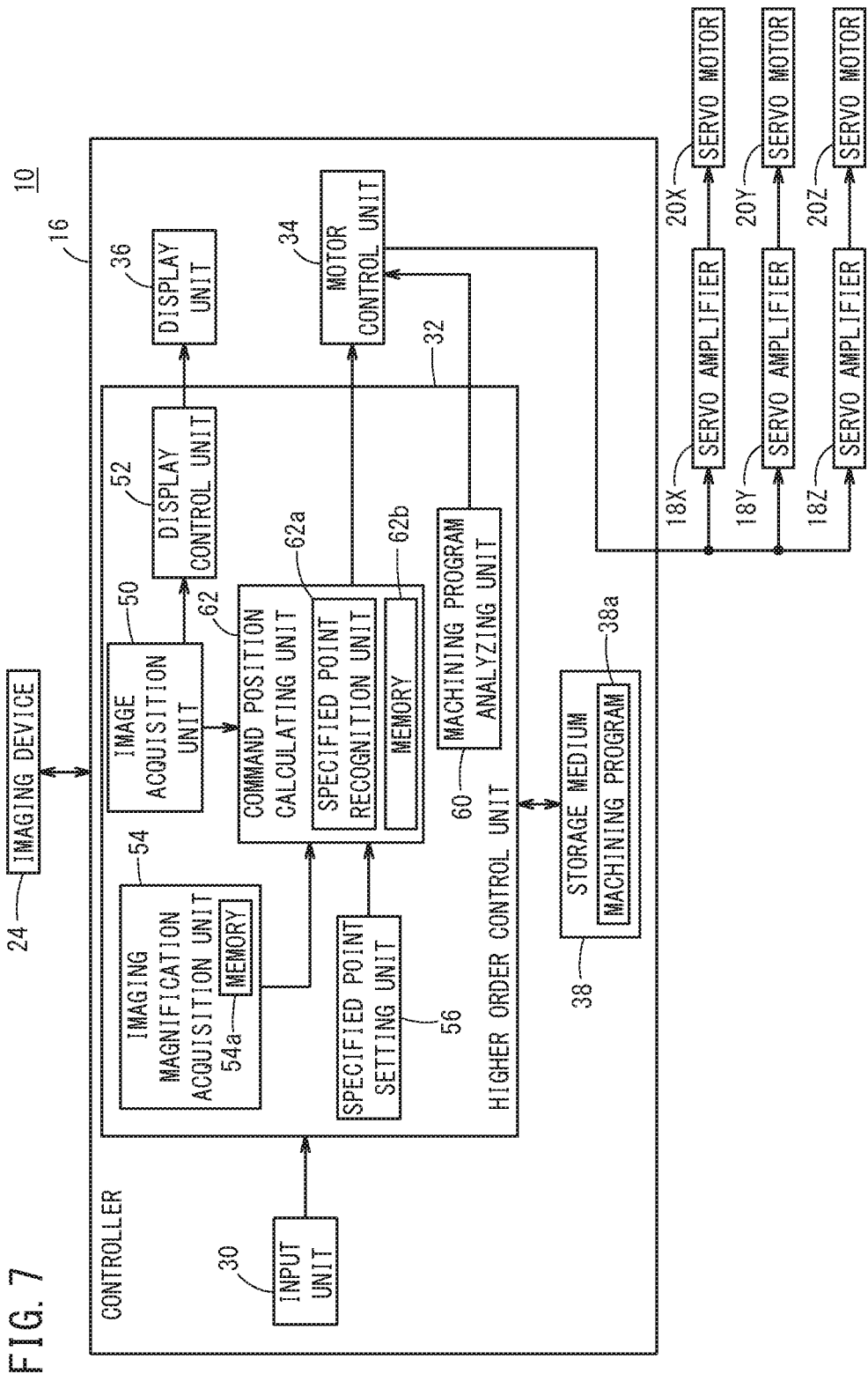
FIG. 7 is a schematic configuration diagram of a machine tool according to a second embodiment.

FIG. 7 is a schematic configuration diagram of a machine tool 10 according to a second embodiment. The same reference numerals as those in the first embodiment denote the same constituent features. Therefore, description of such features is omitted, and only features that differ from those of the first embodiment will be described in detail.

In the machine tool 10 according to the first embodiment described above, before and after a change takes place in the imaging magnification M, an axial movement control is performed so as to maintain the relative positional relationship between the specified point Si and the imaging center position Ci in the image. However, with the machine tool 10 according to the second embodiment, the tool 12 is axially moved in a manner so that the position of the specified point Si on the tool 12 in the image and the imaging center position (the position of a predetermined reference point) Ci in the image coincide with each other.

The machine tool 10 of the second embodiment has substantially the same configuration as the machine tool 10 of the first embodiment, but differs therefrom in that the higher order control unit 32 includes a command position calculating unit 62 instead of the command position calculating unit 58. The command position calculating unit 62 includes a specified point recognition unit 62a and a memory 62b. When a specified point Si on the tool 12 is set by the specified point setting unit 56, the specified point recognition unit 62a extracts a feature of the specified point Si on the tool 12, on the basis of the position of the specified point Si in the image which is output from the specified point setting unit 56, and the image acquired by the image acquisition unit 50, and stores the extracted feature in the memory 62b. For example, the specified point recognition unit 62a may extract as a feature of the specified point Si a relative positional relationship between the shape of the tool 12 or the contour of the tool 12 and the set specified point Si, or a feature of the set specified point Si itself may be extracted. In essence, any feature that enables the specified point Si to be recognized is sufficient.

Further, based on the feature stored in the memory 62b, the specified point recognition unit 62a recognizes at which position the specified point Si exists from within the image captured at the imaging magnification M after having been changed, which was newly acquired by the image acquisition unit 50. The specified point recognition unit 62a recognizes the position of the specified point Si by analyzing the image captured with the newly acquired imaging magnification M after having been changed.

The command position calculating unit 62 calculates the movement command position Pc of the tool 12 on the basis of the position of the specified point Si in the image and the imaging magnification M of the image, in a manner so that the position of the specified point Si of the tool 12 in the image coincides with the imaging center position Ci in the image. In the case that the position of the specified point Si of the tool 12 in the image and the imaging center position Ci in the image are not shifted, the command position calculating unit 62 need not necessarily calculate the movement command position Pc of the tool 12.

More specifically, the command position calculating unit 62 calculates the position of the specified point Sr in the machine coordinate system, from the position of the specified point Si in the image that is output from the specified point setting unit 56, and the current imaging magnification M. In addition, the command position calculating unit 62 calculates the movement command position Pc (Pcy, Pcz) on the basis of the calculated position of the specified point Sr, and the imaging center position Cr in the machine coordinate system. In other words, the command position calculating unit 62 calculates the movement command position Pc (Pcy, Pcz) in a manner so that the specified point Sr in the machine coordinate system moves to the imaging center position Cr in the machine coordinate system. Moreover, the imaging center position Ci in the image and the imaging center position Cr in the machine coordinate system are stored in the memory 62b.

Figure 8:
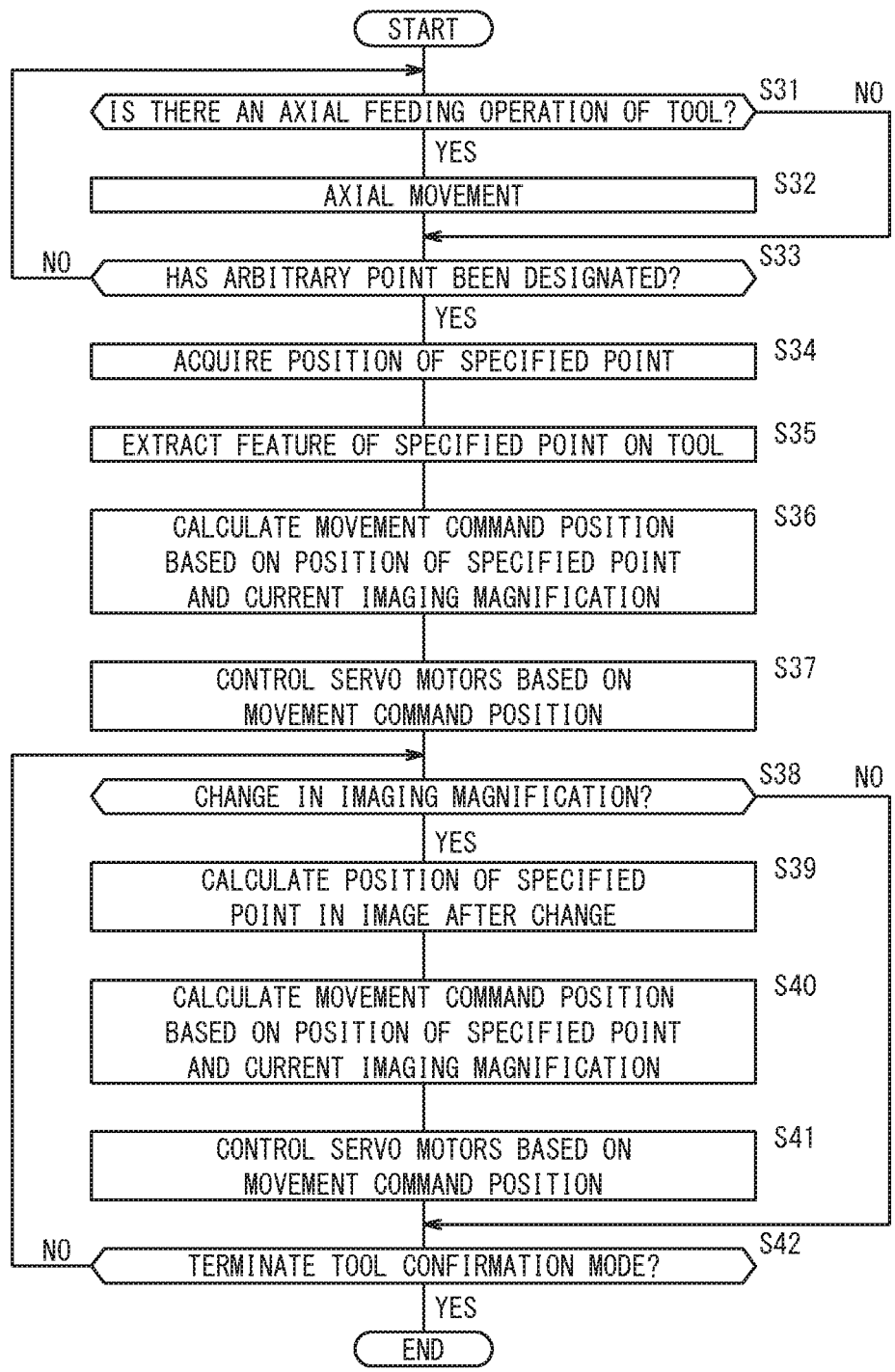
FIG. 8 is a flowchart illustrating operations of the machine tool shown in FIG. 7 when a tool confirmation mode is set.

FIG. 8 is a flowchart showing operations of the machine tool 10 shown in FIG. 7 when the tool confirmation mode is set. When the tool confirmation mode for confirming the state of the tool 12 is set, in step S31, the higher order control unit 32 determines whether or not an axial feeding operation of the tool 12 has been performed by an operation of the input unit 30 made by the operator. If it is determined in step S31 that an axial feeding operation has been performed, the process proceeds to step S32. On the other hand, if it is determined in step S31 that an axial feeding operation has not been performed by the operator, the process proceeds to step S33. Moreover, at this time, it is assumed that the imaging device 24 captures images of the tool 12 at the imaging magnification M that was set in step S2 of FIG. 3, and the captured images are displayed on the display unit 36 (steps S3, S4 of FIG. 3). Further, during the operations of FIG. 8, the operations of FIG. 3 are executed in parallel, and the operator is able to change the imaging magnification M.

Upon proceeding to step S32, the motor control unit 34 controls the servo motors 20Y, 20Z based on the axial feeding operation made by the operator, whereby axial movement of the tool 12 is carried out, and then the process proceeds to step S33. At this time, the command position calculating unit 58 outputs the movement command position Pc to the motor control unit 34 in accordance with the operation of the input unit 30 made by the operator. Consequently, the operator can axially feed the tool 12 in a manner so that the tool 12 enters into the imaging range (angle of view) of the imaging device 24.

Upon proceeding to step S33, the specified point setting unit 56 determines whether or not an arbitrary point on the tool 12 has been designated in the image displayed on the display unit 36 by an operation of the input unit 30 made by the operator. The operator can designate an arbitrary point on the tool 12 by operating a mouse or the like, or can designate an arbitrary point on the tool 12 by touching the display screen of the display unit 36 on which the touch panel is provided.

In step S33, if the specified point setting unit 56 determines that an arbitrary point on the tool 12 has been designated, the process proceeds to step S34. On the other hand, if it is determined in step S33 that designation of an arbitrary point has not been performed by the operator, the process returns to step S31.

Upon proceeding to step S34, the specified point setting unit 56 sets the designated point as the specified point Si, and calculates and acquires the position of the set specified point Si in the image.

Next, in step S35, the specified point recognition unit 62a extracts the feature of the specified point Si on the tool 12 based on the position of the specified point Si in the image set in step S34, and the image acquired by the image acquisition unit 50, and stores the feature in the memory 62b.

Next, in step S36, the command position calculating unit 62 calculates the movement command position Pc of the tool 12 on the basis of the position of the specified point Si in the image that was set in step S34, and the current imaging magnification M, in a manner so that the position of the specified point Si of the tool 12 in the image coincides with the imaging center position Ci in the image.

Next, in step S37, the motor control unit 34 controls the servo motors 20Y, 20Z respectively based on the movement command position Pc (Pcy, Pcz) calculated by the command position calculating unit 62, whereby axial movement is performed. Consequently, in the image, the position of the specified point Si of the tool 12 and the imaging center position Ci coincide with each other.

Next, in step S38, the imaging magnification acquisition unit 54 determines whether or not the imaging magnification M has been changed due to an operation of the input unit 30 made by the operator. If it is determined in step S38 that the imaging magnification M has been changed, the process proceeds to step S39, whereas if it is determined that the imaging magnification M has not been changed, the process proceeds to step S42. Moreover, if the imaging magnification M has been changed, the imaging magnification acquisition unit 54 acquires the imaging magnification M after having been changed, and stores the acquired imaging magnification M in the memory 54a.

Upon proceeding to step S39, on the basis of the feature extracted in step S35, the specified point recognition unit 62a calculates the position of the specified point Si in the image that was captured at the (current) imaging magnification M after having been changed.

Next, in step S40, the command position calculating unit 62 calculates the movement command position Pc (Pcy, Pcz) of the tool 12 on the basis of the position of the specified point Si in the image that was calculated in step S39, and the (current) imaging magnification M after having been changed, in a manner so that the position of the specified point Si of the tool 12 in the image that was captured at the (current) imaging magnification M after having been changed coincides with the imaging center position Ci in the image.

Next, in step S41, the motor control unit 34 controls the servo motors 20Y, 20Z respectively based on the movement command position Pc (Pcy, Pcz) calculated by the command position calculating unit 62, whereby axial movement is performed. Consequently, in the image, the position of the specified point Si of the tool 12 and the imaging center position Ci coincide with each other.

Next, in step S42, the higher order control unit 32 determines whether or not the tool confirmation mode has been terminated. If setting of the tool confirmation mode has been canceled by an operation of the input unit 30 made by the operator, the higher order control unit 32 determines that the tool confirmation mode has been terminated.

Next, if it is determined in step S42 that the tool confirmation mode has not been terminated, the process returns to step S38, and the above-described operations are repeated. On the other hand, if it is determined in step S42 that the tool confirmation mode has been terminated, the present operations are brought to an end.

Figure 9A:
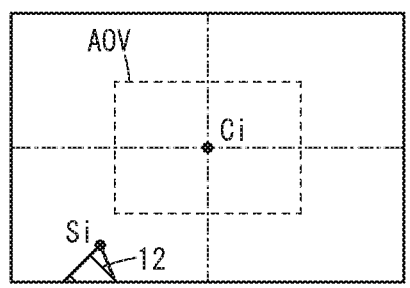
FIG. 9A is a view showing an image at a time that an image of a tool is captured at an imaging magnification of low magnification.
Figure 9B:
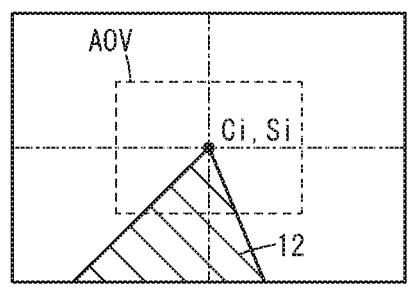
FIG. 9B is a view showing an image at a time that an image of a tool is captured after the elapse of a predetermined time period from having set a specified point in the image shown in FIG. 9A.
Figure 9C:
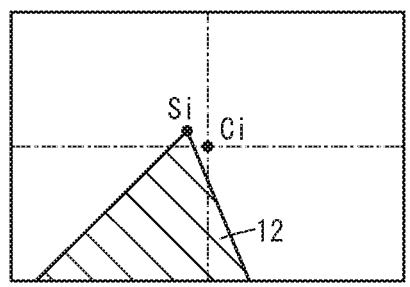
FIG. 9C is a view showing an image at a time that an image of a tool is captured immediately after having changed from an imaging magnification of low magnification to an imaging magnification of high magnification.
Figure 9D:
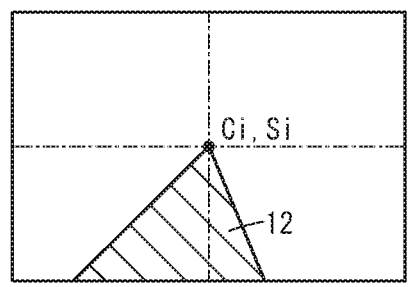
FIG. 9D is a view showing an image at a time that an image of a tool is captured after the elapse of a predetermined time period from having changed the imaging magnification.

FIGS. 9A to 9D are views showing images captured by the machine tool 10 shown in FIG. 7. FIG. 9A is a view showing an image at a time that an image of the tool 12 is captured at an imaging magnification Ma of low magnification, FIG. 9B is a view showing an image at a time that an image of the tool 12 is captured after the elapse of a predetermined time period from having set the specified point Si in the image shown in FIG. 9A, FIG. 9C is a view showing an image at a time that an image of the tool 12 is captured immediately after having changed from the imaging magnification Ma of low magnification to an imaging magnification Mb of high magnification, and FIG. 9D is a view showing an image at a time that an image of the tool 12 is captured after the elapse of a predetermined time period from having changed to the imaging magnification Mb. Moreover, the frames AOV shown in FIGS. 9A and 9B illustrate the angle of view of the imaging magnification Mb.

In the state shown in FIG. 9A, when the cutting edge is set as the specified point Si, then as shown in FIG. 9B, the tool 12 is moved in a manner so that the cutting edge Si in the image comes to the imaging center position Ci. Thereafter, when the imaging magnification M is changed from Ma to Mb, as shown in FIG. 9C, the position of the specified point Si displayed in the image deviates from the imaging center position Ci. The reason therefore is as follows. Since the cutting edge Si is designated and set in the image of the imaging magnification Ma of low magnification, even if the position of the cutting edge Sr in the machine coordinate system is calculated from the imaging magnification Ma and the set position of the cutting edge Si in the image, an error will occur between the calculated position and the actual position of the cutting edge Si in the machine coordinate system. Although the error cannot be perceived in the image captured at low magnification, when the cutting edge Si is captured at high magnification, such an error will appear.

Even in the case that the position of the cutting edge Si in the image captured with the imaging magnification Mb of high magnification is deviated from the imaging center position Ci, as shown in FIG. 9D, the tool 12 is moved in a manner so that the cutting edge Si comes to the imaging center position Ci in the image captured with the magnification Mb of high magnification.

In the foregoing manner, according to the second embodiment, the tool 12 can be moved in a manner so that the specified point (cutting edge) Si of the tool 12 in the image comes to the imaging center position Ci. Accordingly, even if the imaging magnification M is changed, since the position of the specified point (cutting edge) Si in the image coincides with the imaging center position Ci, it is possible to prevent the specified point (cutting edge) Si from being framed out, i.e., from falling outside the image area. Further, it is possible for the tool 12 (and in particular, the specified point Si thereon) to be easily confirmed by the operator.

[Modifications]

At least one of the above-described first and second embodiments can be modified in the following ways.

(Modification 1) In the above-described first and second embodiments, an image of the tool 12 is captured in order to confirm the state of the tool 12. However, an image of the workpiece W may also be captured in order to confirm the state of the workpiece W. In this case, the operator designates an arbitrary point on the workpiece W in the image, and the specified point setting unit 56 sets as the specified point Si the arbitrary point on the workpiece W that was designated. Therefore, according to Modification 1, it is necessary for the imaging device 24 to be installed in a manner so as to be capable of capturing images of the axial movement of the table 14 (workpiece W). At this time, the imaging device 24 is installed at a position where images can be captured of the table 14 (workpiece W) from a direction that intersects with the movement direction (X-axis direction) of the table 14.

(Modification 2) In the above-described first and second embodiments, the table 14 (workpiece W) is axially moved in a single axial direction (X-axis direction). However, the table 14 (workpiece W) may be moved along a plane (for example, on the XY plane, on the XZ plane, or the like). In the event it is desired to capture images of the state of axial movement of the table 14 (workpiece W), the imaging device 24 may be installed so as to enable capturing of images from a direction that intersects (and more particularly, is perpendicular to) the plane in which the table 14 axially moves.

(Modification 3) In the above-described first and second embodiments, the specified point setting unit 56 sets as the specified point Si an arbitrary point on the tool 12 that is designated by an operation of the input unit 30 made by the operator. However, a predetermined point on the tool 12 may be set as the specified point Si. In this case, by acquiring an image from the image acquisition unit 50 and performing image analysis on the acquired image, the specified point setting unit 56 may extract a predetermined feature point on the tool 12, and set the extracted feature point as the specified point Si. Even in the case that the operator does not designate a specified point Si, the specified point Si can be set automatically. In this case, the operator may provide an instruction on when to set the specified point Si. This is because there may be situations in which the operator wishes to set the specified point Si after having set the relative positional relationship between the tool 12 and the imaging center position Ci in the image to a desired positional relationship by performing an axial feeding operation.

(Modification 4) In the above-described first and second embodiments, the imaging center position Cr in the machine coordinate system is known beforehand. However, the command position calculating units 58, 62 may calculate the imaging center position Cr in the machine coordinate system from the imaging center position Ci in the captured image, and the current imaging magnification M.

(Modification 5) In the first embodiment, the movement command position Pc is calculated using the ratio α of the changed imaging magnification M to the reference magnification Mm. However, the movement command position Pc may be calculated using the current (changed) imaging magnification M and the previous imaging magnification M. In this case, it is necessary for the memory 54a also to store at least the previous imaging magnification M.

In the case that the movement command position Pc is calculated from the previous imaging magnification M (≠ reference magnification Mm) and the imaging magnification M after having been changed (i.e., the current imaging magnification), the distance Lr between the position of the specified point Sr and the imaging center position Cr in the machine coordinate system (the distance Lr at the previous imaging magnification M), at the time that the tool 12 is moved on the basis of the movement command position Pc that was calculated when changing to the previous imaging magnification M, is used. The distance Lr at the time of the previous imaging magnification M may be obtained using the distance Lr at the reference magnification Mm, or may be obtained from the movement command position Pc that was calculated when changing to the previous imaging magnification M.

Alternatively, the relative positional relationship (direction D, distance Lr) between the specified point Sr and the imaging center position Cr in the machine coordinate system at the time when an image is captured at the previous imaging magnification M (≠ reference magnification Mm) may be newly calculated. In the case of newly calculating the relative positional relationship, at a state in which axial movement takes place accompanying the change to the previous imaging magnification M (≠ reference magnification Mm), it is necessary to recognize the position of the specified point Si in the image that was captured at the previous imaging magnification M. Thus, as described in the second embodiment, by providing the specified point recognition unit 62a in the command position calculating unit 58, it is possible to recognize the position of the specified point Si in the image. In addition, the movement command position Pc can be obtained from the relative positional relationship at the time of the newly calculated previous imaging magnification M, the previous imaging magnification M, and the current imaging magnification M.

(Modification 6) In the above-described second embodiment, the imaging center position Ci has been described as the position of a predetermined reference point. However, by the input unit 30 being operated by the operator, the position of the reference point may arbitrarily be changed. In this case, the angle of view is changed in accordance with the imaging magnification M, in a manner so that a center of the angle of view of the image becomes the reference point. Accordingly, when a point other than the imaging center position Ci is designated as the reference point, the imaging device 24 enlarges the image by way of electronic zooming. In this case, the command position calculating unit 62 stores in the memory 62b the position of the reference point on the image. Further, the command position calculating unit 62 calculates the position of the reference point in the machine coordinate system from the position of the reference point in the image, and the current imaging magnification M.

(Modification 7) The above-described modifications 1 to 6 may be arbitrarily combined within a range in which no inconsistencies occur therein.

In the foregoing manner, the machine tool 10 as described in the above-noted first embodiment and the modifications comprises the servo motors 20 configured to cause axial movement of the tool 12 or the workpiece W, the imaging device 24 configured to capture an image of the tool 12 or the workpiece W at the specified imaging magnification M, the display unit 36 configured to display the image captured by the imaging device 24, the command position calculating unit 58 configured to, in the case that the imaging magnification M is changed, calculate the movement command position Pc of the tool 12 or the workpiece W on the basis of the imaging magnification M before and after having been changed, so as to maintain the relative positional relationship between the specified point Si of the tool 12 or the workpiece W in the image, and an imaging center position Ci in the image before and after the change in the imaging magnification M, and the motor control unit 34 configured to control the servo motors 20 in a manner so that the tool 12 or the workpiece W is axially moved on the basis of the movement command position Pc.

Consequently, even if the imaging magnification M is changed, it is possible to maintain the relative positional relationship between the imaging center position Ci and the position of the specified point Si in the image. Accordingly, even if the imaging magnification M is changed from a low magnification to a high magnification, it is possible to prevent a situation in which the specified point Si becomes framed out from the image. Further, even if the imaging magnification M is changed, since the relative positional relationship between the imaging center position Ci and the position of the specified point (cutting edge) Si in the image is not changed, it becomes easy for the operator to confirm the tool 12 (and in particular, the specified point Si thereon).

The specified point setting unit 56 sets as the specified point Si an arbitrary point on the tool 12 or the workpiece W in the image, the arbitrary point being designated by the operator. In accordance with this feature, the operator is capable of setting as the specified point Si any arbitrary point on the tool 12 or the workpiece W that the operator desires to observe in particular.

The specified point setting unit 56 extracts a predetermined feature point on the tool 12 or the workpiece W by analyzing the image, and sets the extracted feature point as the specified point Si. In accordance with this feature, the specified point Si can be automatically set without the need for the operator to manually designate a specified point Si on the tool 12 or the workpiece W.

The command position calculating unit 58 includes the relative position calculating unit 58a configured to calculate the relative positional relationship between the specified point Sr and the imaging center position Cr in a machine coordinate system on the basis of the imaging magnification M and the position of the specified point Si in the image, and when the imaging magnification M is changed, the command position calculating unit calculates the movement command position Pc on the basis of the calculated relative positional relationship in the machine coordinate system, and the imaging magnification M before and after having been changed. In accordance with this feature, the movement command position Pc for the purpose of moving the tool 12 or the workpiece W can be easily calculated, and even if the imaging magnification M is changed, the relative positional relationship between the specified point Si and the imaging center position Ci can be maintained.

The relative positional relationship in the machine coordinate system includes the direction D of the specified point Sr as viewed from the imaging center position Cr in the machine coordinate system, and the distance Lr between the imaging center position Cr and the specified point Sr in the machine coordinate system. The command position calculating unit 58 calculates the movement command position Pc in a manner so that the specified point Sr moves to a position of an intersecting point between the direction D and a circle having a radius of Lr×1/α from the imaging center position Cr in the machine coordinate system, where α denotes a ratio of the imaging magnification M after having been changed to the imaging magnification M before being changed, and Lr denotes the distance. Consequently, the movement command position Pc for the purpose of moving the tool 12 or the workpiece W can be easily calculated.

The tool 12 or the workpiece W moves axially along a plane, and the servo motors 20 comprise the servo motor 20Y configured to cause the tool 12 or the workpiece W to move axially in the first direction (Y-direction), and the servo motor 20Z configured to cause the tool 12 or the workpiece W to move axially in the second direction (Z-direction) that is perpendicular to the first direction. The imaging device 24 captures the image of the tool 12 or the workpiece W from a direction that intersects the plane defined by the first direction and the second direction. In accordance with this feature, it is possible for the tool 12 or the workpiece W to be moved axially along a plane. Further, since the imaging device 24 captures images from a direction that intersects the plane defined by the first direction and the second direction, it is possible to suitably capture images of the state of axial movement of the tool 12 or the workpiece W.

The movement command position Pc includes the first movement command position (Pcy) in the first direction, and the second movement command position (Pcz) in the second direction. The command position calculating unit 58 calculates the first movement command position Pcy and the second movement command position Pcz on the basis of the imaging magnification M before and after having been changed. The motor control unit 34 controls the servo motor 20Y in a manner so that the tool 12 or the workpiece W moves axially along the first direction to the first movement command position Pcy, and controls the servo motor 20Z in a manner so that the tool 12 or the workpiece W moves axially along the second direction to the second movement command position Pcz. Consequently, since the tool 12 or the workpiece W is axially moved along a plane, the degree of freedom in setting the specified point Si (the position of the specified point Si to be set) is improved.

In the foregoing manner, the machine tool 10 as described in the above-noted second embodiment and the modifications comprises the servo motors 20 configured to cause axial movement of the tool 12 or the workpiece W, the imaging device 24 configured to capture an image of the tool 12 or the workpiece W at the specified imaging magnification M, the display unit 36 configured to display the image captured by the imaging device 24, the command position calculating unit 62 configured to calculate the movement command position Pc of the tool 12 or the workpiece W on the basis of the positions of the specified point Si and the reference point in the image, and the imaging magnification M, in a manner so that the specified point Si on the tool 12 or the workpiece W in the image coincides with the predetermined reference point in the image, and the motor control unit 34 configured to control the servo motors 20 in a manner so that the tool 12 or the workpiece W is axially moved on the basis of the movement command position Pc.

In this manner, the tool 12 can be moved so that the specified point Si of the tool 12 in the image comes to the predetermined reference point. Accordingly, even if the imaging magnification M is changed, since the position of the specified point Si in the image coincides with the position of the reference point, it is possible to prevent the specified point Si from being framed out.

The specified point setting unit 56 sets as the specified point Si an arbitrary point on the tool 12 or the workpiece W in the image, the arbitrary point being designated by the operator. In accordance with this feature, the operator is capable of setting as the specified point Si any arbitrary point on the tool 12 or the workpiece W that the operator desires to observe in particular.

The specified point setting unit 56 extracts a predetermined feature point on the tool 12 or the workpiece W by analyzing the image, and sets the extracted feature point as the specified point Si. In accordance with this feature, the specified point Si can be automatically set without the need for the operator to manually designate a specified point Si on the tool 12 or the workpiece W.

The reference point is the imaging center position Ci of the image or a point designated by the operator. In accordance with this feature, in the case that the imaging center position Ci serves as the reference point, even if the imaging magnification M is changed, since the specified point Si comes to the imaging center position Ci, it becomes easy for the tool 12 (and in particular, the specified point Si thereon) to be confirmed by the operator. Further, in the case that an arbitrary point in the image as designated by the operator serves as the reference point, the degree of freedom in carrying out the confirmation operation by the operator is improved.

The tool 12 or the workpiece W moves axially along a plane, and the servo motors 20 comprise the servo motor 20Y configured to cause the tool 12 or the workpiece W to move axially in the first direction (Y-direction), and the servo motor 20Z configured to cause the tool 12 or the workpiece W to move axially in the second direction (Z-direction) that is perpendicular to the first direction. The imaging device 24 captures the image of the tool 12 or the workpiece W from a direction that intersects the plane defined by the first direction and the second direction. In accordance with this feature, it is possible for the tool 12 or the workpiece W to be moved axially along a plane. Further, since the imaging device 24 captures images from a direction that intersects the plane defined by the first direction and the second direction, it is possible to suitably capture images of the state of axial movement of the tool 12 or the workpiece W.

The movement command position Pc includes the first movement command position (Pcy) in the first direction, and the second movement command position (Pcz) in the second direction. The command position calculating unit 62 calculates the first movement command position Pcy and the second movement command position Pcz on the basis of the positions of the specified point Si and the reference point in the image, and the imaging magnification M of the image. The motor control unit 34 controls the servo motor 20Y in a manner so that the tool 12 or the workpiece W moves axially along the first direction to the first movement command position Pcy, and controls the servo motor 20Z in a manner so that the tool 12 or the workpiece W moves axially along the second direction to the second movement command position Pcz. Consequently, since the tool 12 or the workpiece W is axially moved along a plane, the degree of freedom in setting the specified point Si and the reference point (the positions of the specified point Si and the reference point to be set) is improved.

In the embodiments described thus far, description has been given that the configuration for causing axial movement of the tool or the workpiece contains the servo motors 20, and the power conversion transmission mechanisms 22 including the ball screws and the nuts. However, in relation to the configuration for causing axial movement of the tool or the workpiece, it is possible to replace the ball screws with static pressure pneumatic screws.

The present invention is not particularly limited to the embodiments described above, and various modifications are possible without departing from the essence and gist of the present invention.

What is claimed is:

1. A machine tool configured to perform machining on a workpiece using a tool, comprising:
a motor configured to cause axial movement of the tool or the workpiece;
an imaging device configured to capture an image of the tool or the workpiece at a specified imaging magnification;
a display unit configured to display the image captured by the imaging device;
a command position calculating unit configured to, in a case that the imaging magnification is changed, calculate a movement command position of the tool or the workpiece based on the imaging magnification before and after having been changed, so as to maintain a relative positional relationship between a specified point of the tool or the workpiece in the image, and an imaging center position in the image before and after the change in the imaging magnification; and
a motor control unit configured to control the motor in a manner so that the tool or the workpiece is axially moved based on the movement command position.

2. The machine tool according to claim 1, further comprising a specified point setting unit configured to set as the specified point an arbitrary point on the tool or the workpiece in the image, the arbitrary point being designated by an operator.

3. The machine tool according to claim 1, further comprising a specified point setting unit configured to extract a predetermined feature point on the tool or the workpiece by analyzing the image, and to set the extracted feature point as the specified point.

4. The machine tool according to claim 1, wherein the command position calculating unit includes a relative position calculating unit configured to calculate a relative positional relationship between the specified point and the imaging center position in a machine coordinate system, based on the imaging magnification and a position of the specified point in the image, and when the imaging magnification is changed, the command position calculating unit calculates the movement command position, based on the calculated relative positional relationship in the machine coordinate system, and the imaging magnification before and after having been changed.

5. The machine tool according to claim 4, wherein:
the relative positional relationship in the machine coordinate system includes a direction of the specified point as viewed from the imaging center position in the machine coordinate system, and a distance between the imaging center position and the specified point in the machine coordinate system; and
the command position calculating unit calculates the movement command position in a manner so that the specified point moves to a position of an intersecting point between the direction and a circle having a radius of $Lr \times 1/\alpha$ from the imaging center position in the machine coordinate system, where $\alpha$ denotes a ratio of the imaging magnification after having been changed to the imaging magnification before being changed, and $Lr$ denotes the distance.

6. The machine tool according to claim 1, wherein:
the tool or the workpiece moves axially along a plane; and
the motor comprises:
a first motor configured to cause the tool or the workpiece to move axially in a first direction; and
a second motor configured to cause the tool or the workpiece to move axially in a second direction perpendicular to the first direction;
wherein the imaging device captures the image of the tool or the workpiece from a direction that intersects the plane defined by the first direction and the second direction.

7. The machine tool according to claim 6, wherein:
the movement command position includes a first movement command position in the first direction, and a second movement command position in the second direction;
the command position calculating unit calculates the first movement command position and the second movement command position based on the imaging magnification before and after having been changed; and
the motor control unit controls the first motor in a manner so that the tool or the workpiece moves axially along the first direction to the first movement command position, and controls the second motor in a manner so that the tool or the workpiece moves axially along the second direction to the second movement command position.

8. An axial movement control method for controlling axial movement of a machine tool configured to perform machining on a workpiece using a tool, wherein:
the machine tool comprises a motor configured to cause axial movement of the tool or the workpiece; and
the axial movement control method comprises:
an imaging step of capturing an image of the tool or the workpiece at a specified imaging magnification;
a displaying step of displaying the captured image on a display unit;
a command position calculating step of calculating, in a case that the imaging magnification is changed, a movement command position of the tool or the workpiece based on the imaging magnification before and after having been changed, so as to maintain a relative positional relationship between a specified point of the tool or the workpiece in the image, and an imaging center position in the image before and after the change in the imaging magnification; and
a motor controlling step of controlling the motor in a manner so that the tool or the workpiece is axially moved based on the movement command position.

9. The axial movement control method according to claim 8, further comprising a specified point setting step of setting as the specified point an arbitrary point on the tool or the workpiece in the image, the arbitrary point being designated by an operator.

10. The axial movement control method according to claim 8, further comprising a specified point setting step of extracting a predetermined feature point on the tool or the workpiece by analyzing the image, and setting the extracted feature point as the specified point.

11. The axial movement control method according to claim 8, wherein the command position calculating step includes a relative position calculating step of calculating a relative positional relationship between the specified point and the imaging center position in a machine coordinate system, based on the imaging magnification and a position of the specified point in the image, and in the command position calculating step, when the imaging magnification is changed, the movement command position is calculated based on the calculated relative positional relationship in the machine coordinate system, and the imaging magnification before and after having been changed.

12. The axial movement control method according to claim 11, wherein:
the relative positional relationship in the machine coordinate system includes a direction of the specified point as viewed from the imaging center position in the machine coordinate system, and a distance between the imaging center position and the specified point in the machine coordinate system; and
the command position calculating step calculates the movement command position in a manner so that the specified point moves to a position of an intersecting point between the direction and a circle having a radius of $Lr \times 1/\alpha$ from the imaging center position in the machine coordinate system, where $\alpha$ denotes a ratio of the imaging magnification after having been changed to the imaging magnification before being changed, and $Lr$ denotes the distance.

13. The axial movement control method according to claim 8, wherein:
the tool or the workpiece moves axially along a plane; and
the motor comprises:
a first motor configured to cause the tool or the workpiece to move axially in a first direction; and
a second motor configured to cause the tool or the workpiece to move axially in a second direction perpendicular to the first direction;
wherein, in the imaging step, the image of the tool or the workpiece is captured from a direction that intersects the plane defined by the first direction and the second direction.

14. The axial movement control method according to claim 13, wherein:
the movement command position includes a first movement command position in the first direction, and a second movement command position in the second direction;
the command position calculating step calculates the first movement command position and the second movement command position based on the imaging magnification before and after having been changed; and
the motor controlling step controls the first motor in a manner so that the tool or the workpiece moves axially along the first direction to the first movement command position, and controls the second motor in a manner so that the tool or the workpiece moves axially along the second direction to the second movement command position.

* * * * *